Oct. 1, 1968

H. E. TOBEY ET AL 3,403,768

BAKING PAN INVERTER

Filed Oct. 25, 1966

INVENTORS
HUBERT E. TOBEY
GEORGE J. McCUTCHEN

BY  *Curtis Ailes*

ATTORNEY

United States Patent Office 3,403,768
Patented Oct. 1, 1968

3,403,768
BAKING PAN INVERTER
Hubert E. Tobey, Rochelle Park, and George J. McCutchen, Teaneck, N.J., assignors to Continental Baking Company, New York, N.Y., a corporation of Delaware
Filed Oct. 25, 1966, Ser. No. 589,368
20 Claims. (Cl. 198—33)

ABSTRACT OF THE DISCLOSURE

The baking pan inverter includes a carriage having a scoop and arranged for movement to extend the scoop away from the center line of the machine in a horizontal direction to engage the underside of a baking pan to be inverted. The carriage then rotates to invert the pan. The scoop includes a cover member to support the inverted pan and the cakes therein after carriage rotation. The carriage then moves in a horizontal retraction motion to retract the scoop. An ejector is provided to engage the pan during scoop retraction to cause the pan and the cakes to be ejected from the scoop.

---

This invention relates to apparatus for inverting baking pans, and more particularly to apparatus for turning over multiple-cavity baking pans which contain cakes, and in which the turning of the pans is particularly useful as a step in the removal of the cakes from the pans.

The term "cake" is used in this specification in its broadest sense to mean virtually any bakery product such as bread, cupcakes, rolls, muffins, tarts, small pies, and the like.

In removing cakes from multiple-cavity baking pans after they have been baked, the usual procedure in a commercial bakery is to have a workman manually lift each baking pan and flip it over so that it lands upside down on a conveyor belt. The pan may then be manually lifted from the belt leaving the cakes upside down upon the belt. Alternatively, the cakes and the pan may be separated from one another by special apparatus associated with the belt conveyor. Apparatus which is particularly well-adapted for this purpose is described and claimed in a co-pending patent application, Ser. No. 575,313, filed on Aug. 26, 1966, for a Cake De-panner, invented by Hubert E. Tobey, and assigned to the same assignee as the present application.

There are a number of serious problems which are encountered when the pans are turned over manually. One of the main problems is that the treatment which both the pans and the cakes receive in this operation is much too rough. After being inverted, the pan is brought down against the conveyor belt with a considerable impact. One of the most important consequences of this impact is that many of the cakes are broken, and thus become unmarketable. This is a particularly serious problem with freshly-baked cupcakes which are very light in texture, and consequently are not particularly coherent. The problem is further aggravated by the factor that some commercial cupcakes are filled with a cream filling which is injected into the cakes before they are removed from the pan. The cream filling causes the interior of the cakes to expand slightly to make space for the cream, and thus puts the cakes under an initial strain.

Another problem relating to the rough treatment of the pans and cakes is that the pans themselves are liable to serious injury and greatly reduced life. They are often bent and soon broken by this rough handling. This is an important expense in a low mark-up, high volume, highly competitive food business.

Another disadvantage to the method of turning over baking pans manually is that it simply is very hard work which generally cannot be handled by a single workman on a continuous basis. Accordingly, the mechanization of this operation promises the saving of the cost of more than one workman.

Still another problem associated with the rough treatment given to the baking pans and cakes is that the impact of the pan and cakes against the conveyor causes accelerated wear of the conveyor and its parts.

Accordingly, it is an object of the present invention to provide an improved apparatus for turning over a baking pan as a step in removing cakes from the pan and in which the operation of the apparatus is particularly characterized by relatively gentle treatment of the pan and the cakes.

Another object of the invention is to provide for turning over a baking pan as a step in the removal of cakes therefrom in which the operation is improved so as to reduce breakage and spoilage of the cakes.

Another object of the invention is to reduce damage to baking pans in the operation of turning the baking pans over as a step in removal of cakes from the pans.

Another object of the invention is to provide a saving of labor in bakeries in reducing the amount of labor required to turn over multiple-cavity baking pans in the course of removing cakes from those pans.

Further objects and advantages of the invention will be apparent from the following description and the accompanying drawings.

In carrying out the invention in one preferred embodiment thereof, there may be provided a baking pan inverter apparatus having a supporting frame and a movable carriage. One end of the carriage is provided with a scoop having means for engaging the baking pan to be emptied. The carriage is arranged for movement to extend the scoop away from the center line of the supporting frame in a generally horizontal direction and to thereby bring the pan engaging means into position to engage the underside of the pan. The carriage is then operable to rotate about the center line to move the scoop up and over in a semi-circular arc to invert the pan. The scoop includes a cover member positioned and arranged to cover the pan prior to the rotational movement of the carriage, and to support the inverted pan and the cakes contained therein after the rotation of the carriage. The carriage is thereafter movable in a substantially horizontal direction to retract the scoop towards the center line. At least one ejector member is provided and arranged to engage the pan and operable in cooperation with the retraction movement of the carriage to cause the inverted pan and the cakes to be ejected from the scoop.

Figure 1:
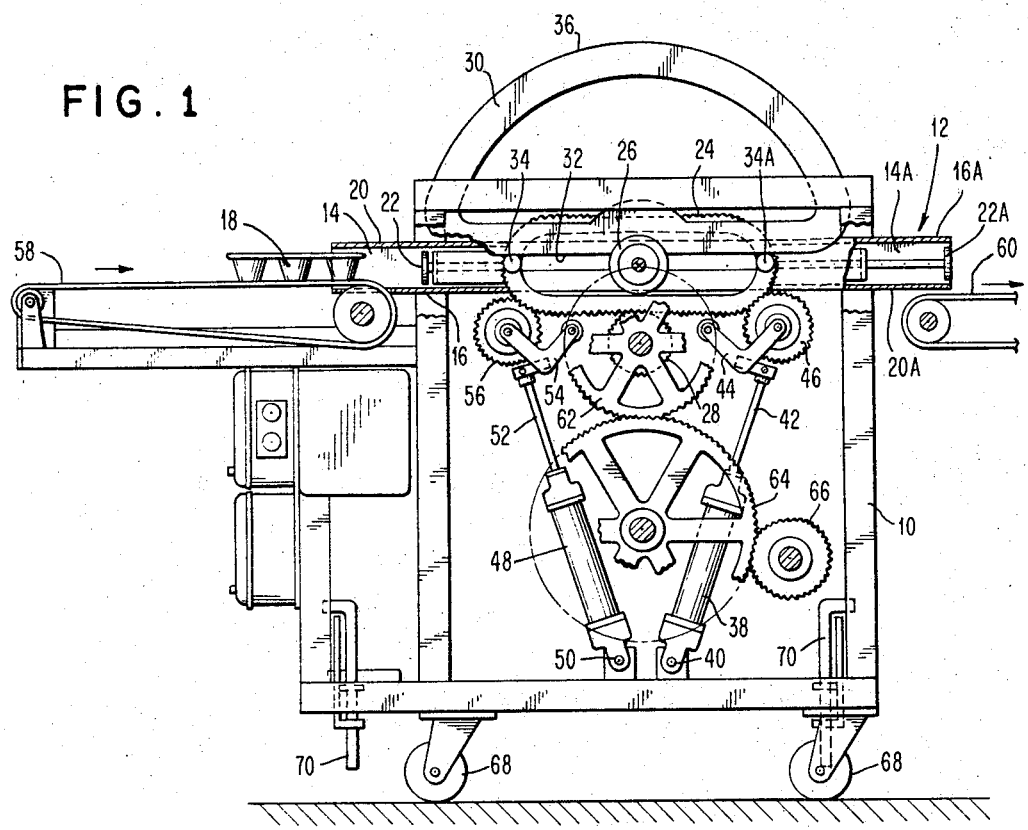
FIG. 1 is a side view of a preferred embodiment of a baking pan inverter in accordance with the present invention.

FIGS. 3, 4, 5, and 6 are skeletal side views of the carriage of the apparatus of FIG. 1 showing the various steps in a typical sequence of operation of the apparatus of FIG. 1.

Figure 7:
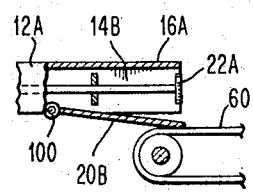

And FIG. 7 is a side view partial detail illustrating an alternative added feature for the invention illustrated in FIG. 1.

Referring more particularly to FIG. 1, there is shown a baking pan inverter apparatus including a supporting frame 10 and a movable carriage generally indicated at 12. One end of the carriage is provided with a scoop 14 including a pan-engaging means 16.

Figure 3:
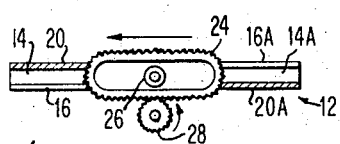
Figure 4:
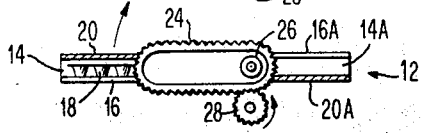
Figure 5:
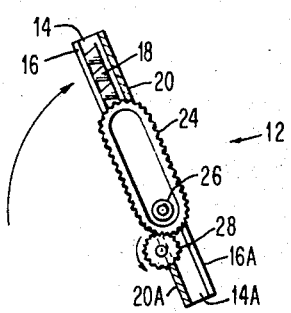
Figure 6:
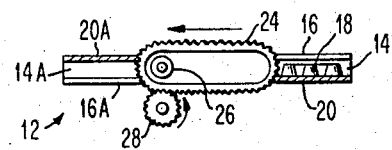

As indicated most clearly by the skeletal drawings of FIGS. 3, 4, 5, and 6, the carriage 12 is arranged for movement away from the center line of the supporting frame in a generally horizontal direction (to the left in FIGS. 3 and 4) to extend the scoop 14 to bring the pan engaging means 16 into position to engage the underside of a pan of cakes 18 (shown in FIGS. 1, 4, 5, and 6). The carriage is then operable to rotate about the center line of the frame, as shown in FIG. 5. This moves the scoop 14 up and over in a semi-circular arc to the position shown in FIG. 6 to thereby invert the pan 18 as a step in emptying the pan. The scoop 14 includes a cover member 20 which is arranged to cover the pan 18 prior to the rotational movement of the carriage 12, and to support the inverted pan and cakes, as shown in FIG. 6, after the rotation of the carriage 12. The carriage 12 is then movable in a substantially horizontal direction to retract the scoop 14 towards the center line of the frame. An ejector 22 (FIG. 1) is arranged to engage the pan, and is operable in cooperation with the retraction movement of the scoop to cause the inverted pan 18, and the cakes therein, to be ejected from the scoop 14. For simplicity and clarity, the ejector 22 is not shown in FIGS. 3, 4, 5, and 6.

In the preferred embodiment of the apparatus illustrated in the drawings, a scoop is provided on each end of the carriage 12. The scoop opposite to the scoop 14 is denoted as 14A, and all of the parts associated with the scoop 14A are designated by numbers corresponding to the similar parts of scoop 14, but with the suffix letter A. The ejector 22A is shown in the fully extended position corresponding to complete ejection of the baking pan.

With a scoop at each end of the carriage 12, in the arrangement shown, a complete cycle of operation of the apparatus is demonstrated by FIGS. 3, 4, 5, and 6, with the carriage returning from the position shown in FIG. 6 to the position shown in FIG. 3 as the pan is ejected. The scoops 14 and 14A are then in reversed positions. It will be appreciated that the operation of the carriage 12 may be substantially continuous such that the end of one cycle merges into the beginning of the next cycle, and the scoop 14A may be extending to pick up another pan while the scoop 14 is retracting to eject a pan, each of these operations involving a substantially horizontal morizontal motion of the carriage 12 (to the left as shown in the drawings).

In the embodiment shown in FIG. 1, the carriage 12 includes an eccentric gear 24, the interior surface of which serves as a bearing in cooperation with a fixed cylindrical hub 26. The eccentric gear 24 is provided with gear teeth on its exterior surface through which it is driven by means of a pinion gear 28 which is rotatable in a counterclockwise direction, as shown in the drawings. It is quite apparent from the drawings, and particularly FIGS. 3, 4, 5, and 6, that the combination of the eccentric gear 24, the support bearing hub 26, and the drive pinion 28, provide for the combination of translational and rotational movement previously described. The translational motion of the carriage 12 proceeds from the position shown in FIG. 3 to the position shown in FIG. 4. At this time, the end of the "slot" of the eccentric gear 24 reaches the bearing hub 26. From this point on, further rotation of the pinion 28 necessarily causes rotation of the carriage 12, as shown in FIG. 5. However, as soon as the rotation progresses to the position indicated in FIG. 6, further counterclockwise rotation of the pinion 28 necessarily drives the eccentric gear 24 and the carriage 12 in a translational mode again.

Preferably, the pinion 28 is not relied upon alone to stabilize the carriage 12 when it is in its horizontal positions indicated in FIGS. 3, 4, and 6. For the purpose of additional stabilization, as shown in FIG. 1, there may be preferably provided a semi-circular cam 30 having a horizontal downwardly facing surface indicated at 32. The cam 30 is fixed to the frame 10 of the apparatus. For cooperation with the cam 30, there may be provided cam follower hubs 34 and 34A which may preferably be attached to the carriage 12 at the outer edges of the eccentric gear 24. However, these cam follower hubs 34 and 34A may also be located at a greater distance from the center of the eccentric gear, if desired, with a corresponding adjustment in the size of the cam 30.

During the rotational movement of the carriage 12, the cam follower hub 34 rides around the outside semi-circular surface 36 of the cam 30. When the rotational part of the operation is completed, and the carriage is in the position corresponding to that shown in FIG. 6, then the cam follower hub 34A has been rotated into position against the bottom surface 32 of the cam 30 to the left of the main bearing hub 26. It thus stabilizes the carriage and prevents further downward rotation of the scoop 14.

Figure 2:
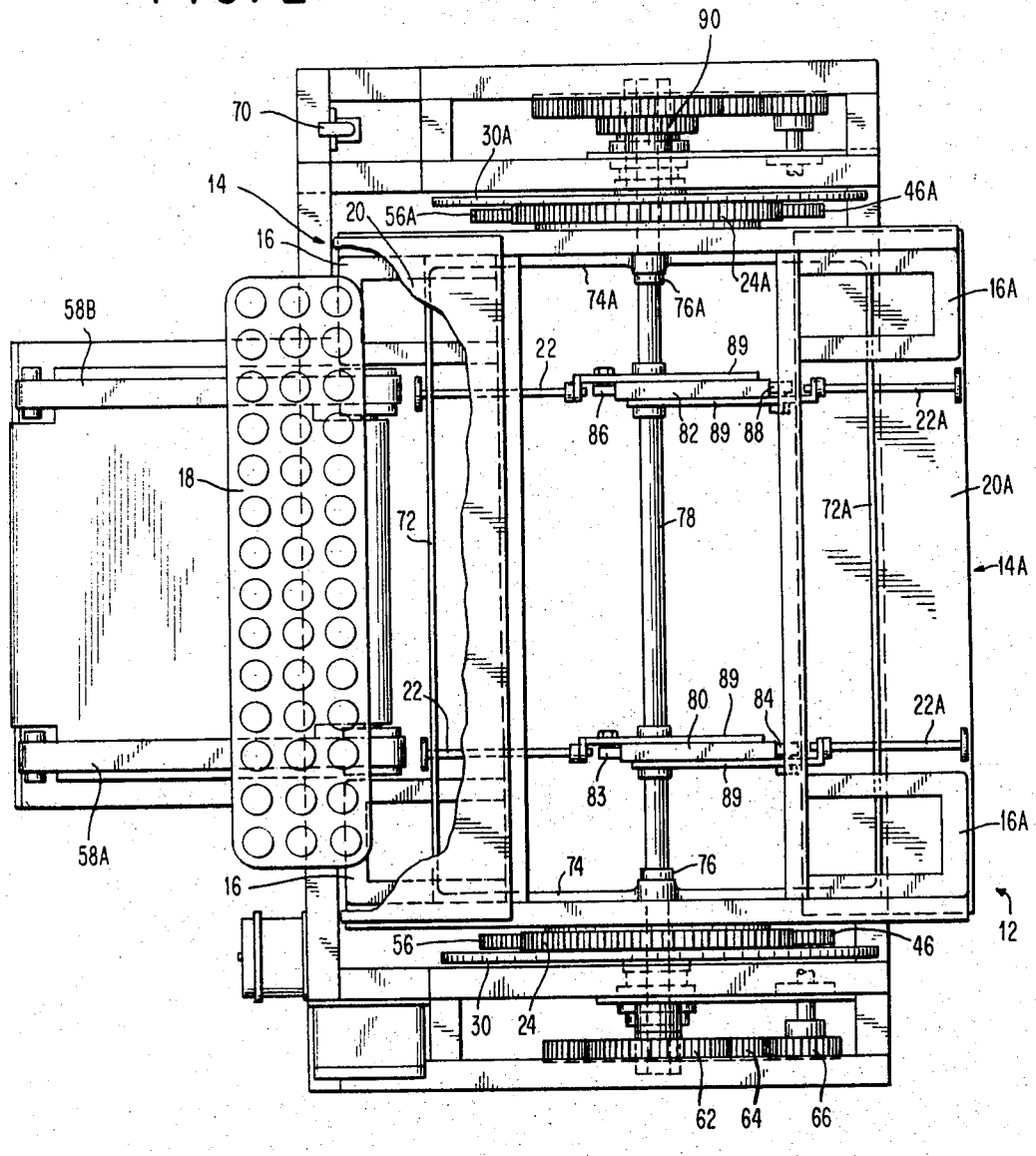
FIG. 2 is a top view of the apparatus of FIG. 1.

FIG. 2 is a top view of the apparatus shown in FIGS. 1, 3, 4, 5, and 6. As shown in FIG. 2, a counterpart of the eccentric gear 24 is provided at the opposite side of the carriage 12 together with counterparts of the other associated components. These counterparts are correspondingly numbered with the suffix letter A. Thus, the carriage 12 is supported at each side, and driven by separate eccentric gears 24 and 24A at each side of the carriage.

As the rotational movement illustrated in FIG. 5 ends with the carriage in the position shown in FIG. 6, it is necessary to decelerate the rotation of the carriage 12 in some manner which will prevent undue strain on the cam 30 and the cam follower hub 34A or 34, and also to prevent rough treatment to the pan 18 with its cakes. Accordingly, an important feature of the invention resides in the provision of a resilient biasing device for the transmission of forces between the carriage 12 and the frame 10 to assist in the deceleration of the rotational movement of the carriage at the end of each cycle of rotational movement. The resilient biasing device in the embodiment illustrated in FIG. 1 consists of a pneumatic cylinder 38 pivotally fixed to the frame 10 at 40, and including a piston having a piston rod 42 extending from the cylinder and attached to a pivoted bell crank 44 having a cam follower device 46 consisting of an idler pinion gear which engages with the eccentric gear 24. At the end of the bell crank 44 opposite to the idler pinion 46, it is pivotally attached to the frame 10. The pneumatic cylinder 38 is under constant internal pressure, being supplied with compressed air from a standard source (not shown) through a check valve which permits the entry of compressed air into the cylinder 38, but prevents escape of such air from the cylinder. When the carriage moves to the far left, as illustrated in FIG. 4, the follower 46 is pushed around to the left as the piston rod 42 extends, and the bell crank 44 rotates in a counterclockwise direction. At the most extended position of the piston and the piston rod 42, additional air may be admitted to the cylinder 38 through its check valve since the pressure is lowest within the cylinder when the piston is in the extended position. Subsequently, when the carriage 12 rotates from the position shown in FIG. 5 to the position shown in FIG. 6, the eccentric gear 24 pushes against the follower 46 causing the piston and the piston rod 42 to descend, substantially compressing the air which is trapped within the cylinder 38. This causes an increasing resisting force to be transmitted through the cylinder 38 to the carriage 12 as the carriage descends.

As previously mentioned, and as illustrated in FIG. 2, an eccentric gear 24A is provided at the opposite side of the carriage. Furthermore, a second decelerating pneumatic cylinder 38A, and other appropriate components, are provided and associated with the eccentric gear 24A. Accordingly, the cylinder 38A also resists the descent of the carriage 12. The volume of each of the cylinders 38 and 38A, the area of the piston within each cylinder, the initial pressure of the air in the cylinders, and the various other controlling parameters are chosen and adjusted to provide a nicely cushioned descent of the carriage 12 which prevents damage to the cakes and the cake pans, reduces wear upon the carriage and the associated apparatus, and reduces the noise associated with operation of the apparatus, all without substantially reducing the speed of operation of the apparatus.

At the other side of the eccentric gear 24, another pneumatic cylinder 48 is provided and pivotally connected to the frame 10 at 50. It has a piston rod 52, a bell crank 54, and an idler gear cam follower 56. These components are all substantially similar in construction and operation to the corresponding parts associated with pneumatic cylinder 38. The cylinder 48 provides a resilient upward biasing force which serves to assist in the beginning of the rotational movement of the carriage 12 as the carriage progresses from the position shown in FIG. 4 to the position shown in FIG. 5. At the top of its stroke, where the piston rod 52 is at its maximum extension, additional air may be provided to the cylinder 48 through its check valve. As the carriage 12 subsequently moves to the left (from the position of FIG. 6 to the position of FIG. 3), the air within the cylinder 48 is compressed, and the cylinder is thus "charged" so that it is again ready to assist in the acceleration of the carriage in the beginning of its rotational movement. Again, although it is not shown, a pneumatic cylinder 48A is provided at the other end of the carriage and having a follower 56A associated with the eccentric gear 24A.

The apparatus is preferably provided with a built-in feed conveyor 58 which is arranged to convey pans 18 to be emptied towards the scoop 14 and up to a position against the ejector 22. Thus, the pan 18 is in a position to be engaged and lifted by the pan-engaging means 16 of the scoop 14 when the scoop is extended. The feed conveyor 58 preferably operates continuously, and a mechanical switch may be provided having a feeler operating lever (not shown) to sense the approach of the cake pan 18 and to start a cycle of operation of the apparatus by extending the scoop, etc. A cam operated switch within the apparatus (not shown) may be provided to interrupt the operation after the cycle of operation is completed, and the carriage returns to the mid-position illustrated in FIGS. 1 and 3. This interruption continues until the arrival of the next pan is detected. If the next pan is already in position, no interruption need take place. An exit conveyor 60 is also preferably provided. However, the exit conveyor need not necessarily be a part of the apparatus as illustrated.

The drive pinion 28 for the eccentric gear 24 may be driven through a suitable gear train, as indicated by the gears 62, 64, and 66. A corresponding gear train may be provided in cooperation with the pinion 28A on the other side of the carriage, and both gear trains are preferably driven by the same motor. The motor and drive train up to the gear 66 may be conventional in construction and are not illustrated. They may include a motor which runs continuously, together with an electromagnetic clutch-brake combination which engages with the motor whenever a cycle of operation is called for, and which engages with the brake whenever operation is to be interrupted.

For maximum flexibility of operation, the entire apparatus is preferably mounted upon wheels 68, and it may be anchored in a particular operating position by means of jacks 70.

Throughout the specification, and the claims, reference is made to the center line of the apparatus. This center line is generally regarded, for this purpose, as corresponding to the center line of the bearing hubs 26 and 26A. This corresponds to the center of rotation of the carriage 12. It is recognized, of course, that this designation of a center line ignores the off-center mass of the feed conveyor 58.

FIG. 2, the top view of the apparatus shown in FIG. 1, illustrates a number of features which are not evident from FIG. 1. For instance, the feed conveyor 58 may conveniently consist of spaced parallel conveyor belts 58A and 58B, as shown in FIG. 2. The pan-engaging means 16 consists of pan-engaging fingers which straddle the ends of the feed conveyor belts 58A and 58B, and which thus are capable of being inserted under the ends of the pan 18 while the pan is still primarily supported upon the conveyor 58. It will be obvious that the pan-engaging fingers 16 could be laterally displaced from the feed conveyor belts 58A and 58B in other ways. Thus, either one, or both, fingers can be arranged between the feed conveyor belts 58A and 58B, as long as the fingers and belts are laterally displaced with respect to one another, and as long as the pan is adequately supported both on the conveyor and on the fingers.

Another important feature which is illustrated in greater detail in FIG. 2 is the ejector structure associated with the ejector plungers 22 and 22A. These plungers are carried and guided by an ejector frame including end members 72 and 72A and side members 74 and 74A. This injector frame is pivotally mounted for rotation about the center line of the frame at the bearing hubs 76 and 76A. Being pivotally mounted for rotation at 76 and 76A, the ejector frame 72–74 is not capable of horizontal translational movement with the carriage 12. However, the ejector frames 72–74 is constructed so as to cooperate with the side frame members of the carriage 12 so as to be rotated with the carriage 12 whenever such rotation occurs. This is accomplished by providing that the side members of the frame of the carriage 12 are U channel construction, and the side frames 74 and 74A are dimensioned and positioned so as to partially "nest" within the open end of the U channel side frames of the carriage 12. This permits relative translational movement of the carriage with respect to the ejector frame while causing the ejector frame to rotate with the carriage 12.

The apparatus also includes a drive shaft 78 which is mounted upon suitable bearings at the center line of the bearing hubs 26 and 26A. Mounted for rotation upon the shaft 78 there are identical ejector plunger cams 80 and 82. These eccentric cams each drive two of the plungers 22 and 22A by means of appropriate cam followers. The cam followers for cam 80 are indicated at 83 and 84, and for cam 82, at 86 and 88. Each cam follower 83–88 is mounted upon a forked frame member 89 which is clamped to the associated plunger 22 or 22A, and forms an extension thereof. Each frame member 89 has a forked end straddling the shaft 78 to keep the associated plunger, and cam follower, in proper alignment within the ejector frame.

The ejector plunger cam shaft 78 is driven at an appropriate speed to assure that the ejector plungers 22 and 22A are extended and retracted at the appropriate times. This shaft is driven by appropriate gearing located at one side of the carriage. A suitable drive gear for this purpose is illustrated at 90. The ejectors 22 and 22A are preferably retracted except during the brief part of each operating cycle when the ejection operation is performed. This occurs once for each 180 degree rotation cycle of the carriage 12. Since the cams 80 and 82 are required to cause the ejection operation once for each of these cycles, the gearing is arranged such as to cause a full circle of rotation of the cam shaft 78 and the cams 80 and 82 for each 180 degree cycle of operation of the carriage 12. Thus, the shaft 78 rotates two full turns for each rotation of the carriage 12. By adjusting the rotational position at which the drive pinion 90 is locked to the cam shaft 78, the operation of the ejector cams 80 and 82 may be adjusted to provide precise timing of the ejector operation. Preferably, the scoop 14 or 14A is retracting as the ejectors 22 or 22A are extending. Thus, a doubled ejecting effect is provided upon the pan.

As an alternative, if greater translational carriage movement is provided for, the ejection plungers 22 and 22A and the associated apparatus may be omitted, and the ejection may be accomplished by the frame 72–74 alone, the frame members 72 or 72A engaging with the edges of the pans to eject the pans from the scoop as the scoop is fully retracted.

Another alternative which is not illustrated here is to provide for essentially double the length of travel by the ejector plungers, but with no reciprocation movement by the carriage 12. The ejection is thus accomplished entirely by the movement of the ejector plungers. This alternative has the advantage of reducing the unbalanced condition of the carriage while it is performing the rotational portion of its operation.

FIG. 7 illustrates an added feature which may be provided in the apparatus of FIG. 1. The cover member 20 may be hingedly connected to the carriage 12. Such a hinged connection is illustrated in FIG. 7 at 100 for a cover 20B, attaching it to a carriage 12A. The hinged connection 100 provides for an outward hinging motion of the cover 20B to provide a partial "opening" of the scoop 14B, and providing an engagement of the cover 20B at its outer edge with the exit conveyor 60. The advantage of this arrangment is that the position of the scoop 14B is thus automatically adjusted to the height of the conveyor 60 so that the pan of cakes need not drop through any appreciable distance as it leaves the cover 20B and commences its period of support upon the exit conveyor 60. In this embodiment, in order to prevent undue vibration and noise in the operation of the cover 20B, it is preferably spring biased towards the open position against a stop member. The spring and the stop member are not illustrated. The spring and stop member provides for an opening movement to a slightly more open position than the cover achieves when it engages the exit belt 60. Thus, the cover 20B is spring biased against the exit conveyor 60 to assure positive engagement therewith. This modification has provided the advantages of automatic adjustment of the height of the scoop 14B with relation to the height of the exit conveyor 60 within a limited range, while assuring gentle treatment to the pan of cakes as it leaves the scoop member cover 20B and is engaged by the exit belt 60.

While this invention has been shown and described in connection with preferred embodiments, it is apparent that various changes and modifications, in addition to those mentioned above, may be made by those who are skilled in the art without departing from the basic features of the invention. Accordingly, it is the intention of the applicants to protect all variations and modifications within the true spirit and valid scope of this invention.

What is claimed is:

1. A baking pan inverter apparatus comprising a supporting frame and a carriage mounted for movement thereon, one end of said carriage being provided with a scoop including pan engaging means, said carriage being arranged for movement such as to extend said scoop away from the center line of said supporting frame in a generally horizontal direction to bring said pan engaging means into position to engage the underside of a pan of cakes to be emptied, said carriage being then operable to rotate about said center line to move said scoop up and over in a semicircular arc to invert the pan to be emptied, said scoop including a cover member positioned and arranged to cover the pan prior to the rotational movement of said carriage and to support the inverted pan and the cakes contained therein after the rotation of said carriage, said carriage being thereafter movable in a substantially horizontal direction to retract said scoop towards said center line, at least one ejector member supported upon said supporting frame and rotatable with said carriage and arranged to engage the pan and operable in cooperation with said retraction movement of said scoop to cause the inverted pan and the cakes therein to be ejected from said scoop, and drive means connected to said carriage for imparting said movements thereto.

2. An apparatus in accordance with claim 1 wherein said ejector member is connected to said drive means and arranged for movement in a direction away from said center line during the retraction movement of said carriage to thereby enhance the ejection operation thereof.

3. An apparatus in accordance with claim 1 wherein there is provided a combined translational and rotational bearing at each side of said carriage, each of said bearings including a slotted bearing member fixed to said carriage and a cylindrical bearing member arranged within said slotted bearing member and fixed to said supporting frame.

4. An apparatus in accordance with claim 3 wherein said slotted bearing member comprises an eccentric gear having exterior gear teeth, and wherein said drive means includes a driving pinion mounted upon said supporting frame and arranged in alignment with said cylindrical bearing member to engage the gear teeth of said eccentric gear opposite the portion of the associated slotted bearing member engaging said cylindrical bearing member, said pinion being operable to drive said carriage through said eccentric gear for translational movement across the large radius portions of said eccentric gear and for rotational movement of said carriage when in cooperation with the small radius end portions of said eccentric gear, said pinion engaging the end portions of said eccentric gear when said cylindrical bearing member is an engagement with the corresponding end portion of said slotted bearing member.

5. Apparatus in accordance with claim 4 wherein there is provided a cam follower at each side of said carriage, each of said cam followers comprising an idler pinion gear arranged to engage with the associated eccentric gear so that the eccentric gear functions as the cam with respect to said cam follower, said cam follower being connected to said frame through a resilient biasing means comprising the combination of a pneumatic cylinder and piston, and the combination of said cam follower and said resilient biasing means being arranged to assist in the deceleration of the rotational movement of said carriage at the end of each cycle of said movement.

6. An apparatus in accordance with claim 1 wherein there is provided at least one cam fixed to said carriage, at least one cam follower connected by a resilient biasing means to said frame and arranged to provide for transmission of forces between said carriage and said frame, said cam follower and said resilient biasing means being arranged to assist in the deceleration of the rotational movement of said carriage at the end of each cycle of said movement.

7. An apparatus in accordance with claim 6 wherein a second resilient biasing means and cam follower are provided and arranged to assist the acceleration of the carriage at the beginning of the rotational mode of operation thereof.

8. Apparatus in accordance with claim 6 wherein said resilient biasing means comprises the combination of a pneumatic cylinder and piston.

9. An apparatus in accordance with claim 1 wherein said carriage is a double ended carriage with a scoop at each end.

10. An apparatus in accordance with claim 9 wherein there is included a feed conveyor arranged to support and convey pans to be emptied towards said center line for engagement by said pan engaging means.

11. An apparatus in accordance with claim 10 wherein there is provided an exit conveyor for receiving the ejected pan and cakes.

12. Apparatus in accordance with claim 11 wherein said scoop cover member of each scoop is hingedly attached and spring biased in the scoop opening direction, a stop member against which said cover member is normally spring biased, said cover member being arranged to have its outer edge yieldably engage the surface of said exit conveyor by reason of said hinged attachment thereof whenever the associated scoop is in the pan ejection position.

13. Apparatus in accordance with claim 10 wherein said pan engaging means comprises fingers which straddle said feed conveyor and which engage the respective ends of the pan on each side of the feed conveyor.

14. Apparatus in accordance with claim 10 wherein said feed conveyor comprises two separate parallel conveyor belts and in which said pan engaging means comprises at least two spaced apart fingers, said conveyor belts and said spaced fingers being transversely spaced with respect to one another so that said fingers may be fully extended beneath the pan while the pan continues to be fully supported upon said feed conveyor until said carriage commences its rotation in which said fingers of said pan engaging means lift the pan off of said feed conveyor.

15. Apparatus in accordance with claim 1 wherein said movable carriage is provided with at least one cam follower at each end thereof and offset from the center line thereof, at least one cam arranged for engagement with each of said cam followers and fixed to said supporting frame, each of said cams having substantially horizontal surfaces arranged to maintain said carriage in a substantially horizontal orientation during horizontal movement thereof.

16. Apparatus in accordance with claim 15 wherein said carriage is double ended and at least two cam followers are provided at each side of said carriage, and wherein said cams fixed to said supporting frame at each side of said carriage each cooperate in common with both of said associated cam followers, said cams including at least one cam at each side of said carriage having a generally semi-circular cam shape to define the combination of rotational and translational movements of said carriage.

17. An apparatus in accordance with claim 1 wherein said carriage includes an eccentric gear at each side edge thereof, said drive means comprising separate pinion gears mounted for rotation upon said supporting frame and positioned for engagement with said eccentric gears to drive said eccentric gears and said carriage through the eccentric carriage movement including horizontal translation and rotation.

18. Apparatus in accordance with claim 1 wherein said ejector member comprises a frame which is rotatable with said carriage but which is pivotally fixed at said center line of said supporting frame.

19. Apparatus in accordance with claim 18 wherein said ejector member includes a plurality of plungers arranged to be supported by said ejector frame and connected to said drive means, said plungers being operable by said drive means to extend outwardly away from said center line to push the pan and cakes during the retraction movement of said carriage.

20. Apparatus in accordance with claim 19 wherein said drive means includes cams for the operation of said jection plungers, and wherein said carriage is double ended with a scoop at each end, and wherein said ejector frame is also double ended and provided with a plurality of ejector plungers at each end, said cams being mounted for rotation about said center line of said frame, and each of said cams being operable to actuate an ejector plunger on each end of said ejector frame.

References Cited
UNITED STATES PATENTS

| | | | |
|---|---|---|---|
| 1,450,423 | 4/1923 | Reese et al. | 198—33 XR |
| 1,783,814 | 12/1930 | Schroeder et al. | |
| 1,793,596 | 2/1931 | Douglass | 214—313 |

ROBERT G. SHERIDAN, *Primary Examiner.*

F. E. WERNER, *Assistant Examiner.*